United States Patent [19]
Reed, III et al.

[11] Patent Number: 4,995,272
[45] Date of Patent: Feb. 26, 1991

[54] TORSIONAL SUSPENSION SYSTEM FOR TESTING SPACE STRUCTURES

[75] Inventors: Wilmer H. Reed, III, Hampton; Ronald R. Gold, Newport News, both of Va.

[73] Assignee: The United States of America as represented by the Administrator of the National Aeronautics and Space Administration, Washington, D.C.

[21] Appl. No.: 357,757

[22] Filed: May 26, 1989

[51] Int. Cl.$^5$ ............ G01M 7/02; G01M 19/00
[52] U.S. Cl. .................... 73/865.6; 73/866.4; 73/663
[58] Field of Search .......... 73/865.6, 663, 866.4

[56] References Cited

U.S. PATENT DOCUMENTS

| | | | |
|---|---|---|---|
| 2,708,525 | 5/1955 | Woleslagle | 248/610 X |
| 3,015,231 | 1/1962 | Ganahl | 73/865.6 |
| 3,281,964 | 11/1966 | Hewes | 434/34 |
| 3,393,889 | 7/1968 | Ogden | 248/332 X |
| 3,421,363 | 1/1969 | Herr | 73/663 |
| 4,135,688 | 1/1979 | England | 248/610 X |

FOREIGN PATENT DOCUMENTS 456169 3/1975 U.S.S.R. ................ 73/663

Primary Examiner—Tom Noland
Attorney, Agent, or Firm—George F. Helfrich; John R. Manning; Charles E. B. Glenn

[57] ABSTRACT

A low frequency torsional suspension system for testing a space structure uses a plurality of suspension stations attached to the space structure along the length thereof in order to suspend the space structure from an overhead support. Each suspension station includes a disk pivotally mounted to the overhead support, and two cables which have upper ends connected to the disk and lower ends connected to the space structure. The two cables define a parallelogram with the center of gravity of the space structure being vertically beneath the pivot axis of the disk. The vertical distance between the points of attachment of the cables to the disk and the pivot axis of the disk is adjusted to lower the frequency of the suspension system to a level which does not interfere with frequency levels of the space structure, thereby enabling accurate measurement.

8 Claims, 2 Drawing Sheets

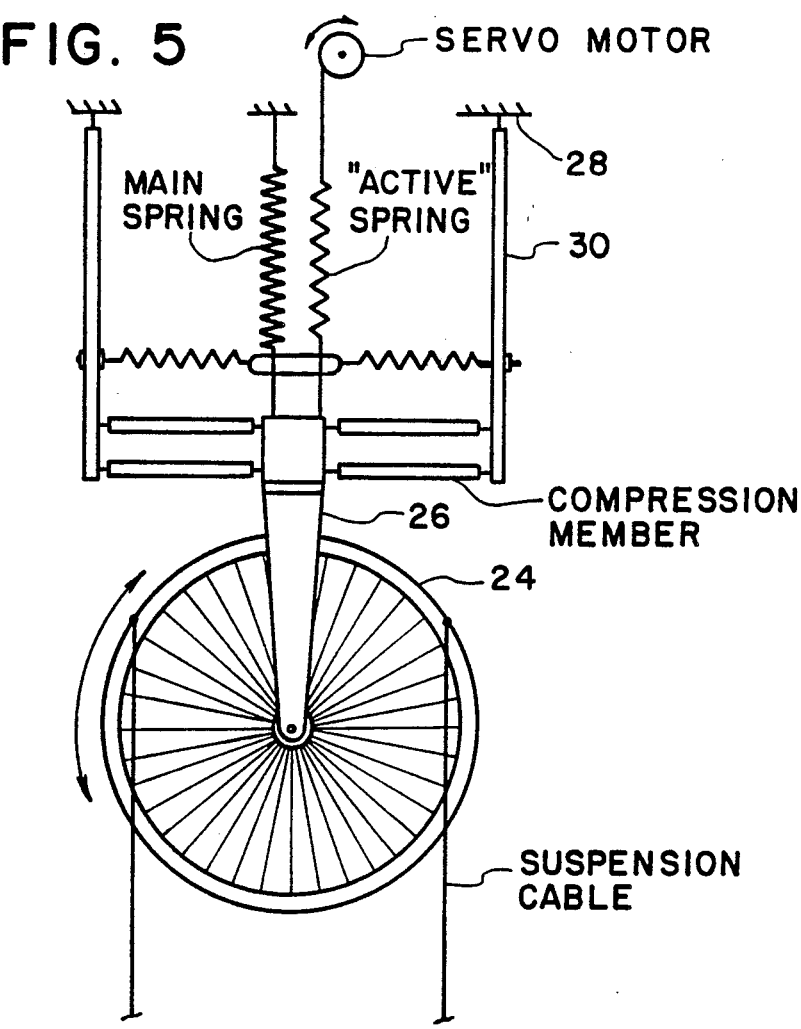
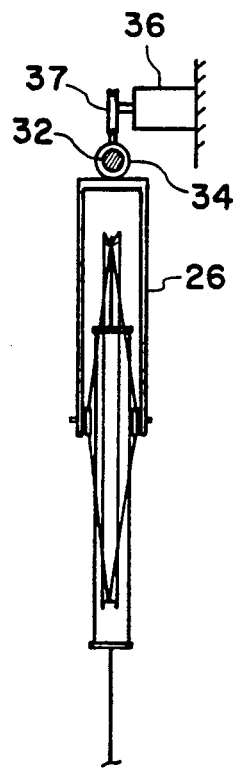
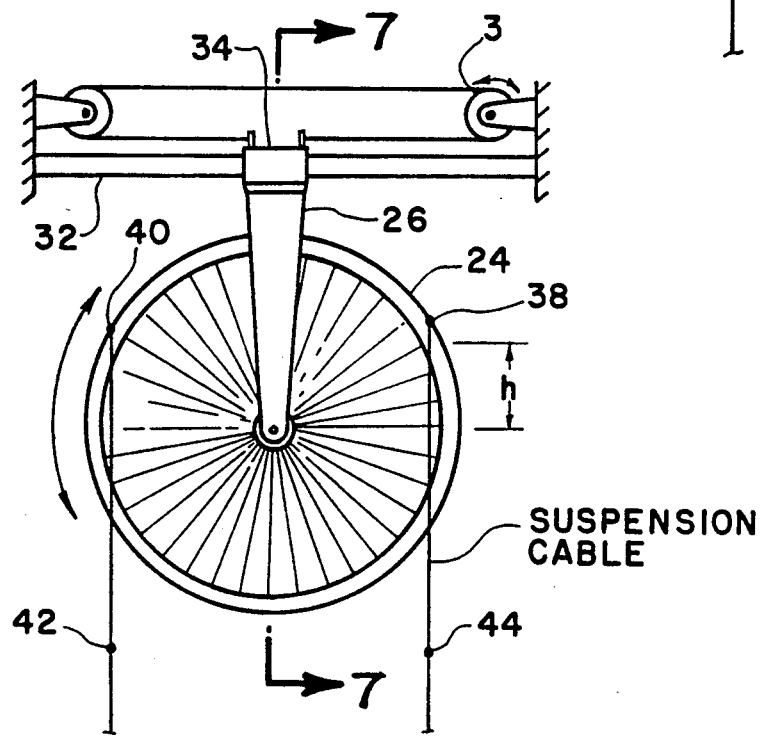

TORSIONAL SUSPENSION SYSTEM FOR TESTING SPACE STRUCTURES

ORIGIN OF THE INVENTION

The invention described herein was made in the performance of work under NASA Contract NAS1-18000. In accordance with 35 USC 202, the contractor elected not to retain title.

BACKGROUND OF THE INVENTION

1. Field of the Invention

The present invention relates to the general field of measuring and testing and, more specifically, to a suspension system used to suspend large space structures for the purpose of testing same in simulated weightless conditions.

2. Description of the Related Art

The proposed use of large space structure has created unique and challenging requirements. The extremely large size and light weight of the structures coupled with the near zero gravity, vacuum environment of space causes difficulty with the control and movement of such structures. To understand and document these difficulties, a significant number of ground-based tests on sample or model large space structures is required.

Ground vibration tests (GTV's) are necessary to characterize a structure's behavior under dynamic conditions such as slewing a large space antenna or a docking maneuver with a space station. GVT's provide data indicative of the structure's natural modes, frequencies, damping, and mode shapes. These data are critical in determining methods of moving and controlling large, light weight space structures..

One of the major difficulties with ground vibration testing of large space structures is suspending the structure to allow freedon of motion similar to that found in space. Although it is impossible to match the near zero gravity environment of space, it is desirable for suspension systems to support the structure in a manner that does not overly constrain its motion. The structural members themselves are not designed to take significant loads such as the weight loading which occurs in a ground test environment.

The extremely large size and relative frailty of the structures themselves, on even scale models of the structures, further adds to the problems associated with suspension systems. For example, elongated beam-type space structures typically have extremely low natural frequencies. The fundamental frequencies will often be below 0.5 Hz. To adequately uncouple the rigid body modes of the structure from the fundamental flexible modes, the rigid body modes should have frequencies substantially lower than the first fundamental mode. In the past, attempts have been made to suspend structures with long cables, in a pendulum fashion from a high ceiling. However, at the extremely low frequencies involved, the required cable lengths become prohibitively long.

Pendulum cable supports limit structural testing to one plane of motion at a time. This support technique ignores the coupling of structural modes in more than one plane and does not address the distortion of torsion modes of beam-like structures.

In additional to planar motions provided by pendulum suspension methods, a suspension system should also allow undistorted motion of the torsional degree of freedom of beam-type structures. Ideally, the pendulum cables should be attached at the node line of the beam first torsion mode. However, since this node line usually lies inside of the beam contour, it is likely to be inaccessible for cable attachments.

Another alternative is to suspend the beam by means of very soft springs and pendulum cables attached to the structure on either side of the torsion node line. However, this approach is complicated by requirements regarding stress and stiffness of the cable/spring design.

SUMMARY OF THE INVENTION

An object of the present invention is to provide a suspension syste for testing large space structures which allows the structure rigid-body movement and minimizes coupling with the flexible or vibrational modes of the structure.

Another object of the present invention is to provide a suspension system which allows freedom of motion of the test structure while adequately distributing the weight loading throughout the test structure.

In a preferred embodiment, a low frequency torsional suspension system for testing a space structure having a length and a center of gravity includes a plurality of suspension stations attached to the space structure along the length thereof for suspending the space structure from a rigid support, such as a ceiling. Each suspension station includes a disk pivotally mounted to the rigid support and having a horizontal pivot axis, and two cables each having upper and lower ends and the same length, the lower ends of the two cables being connectable to the space structure and the upper ends being connectable to the disks so that the points of attachment for the upper and lower ends of the two cables define a parallelogram with the center of gravity of the space structure being vertically beneath the pivot axis of the disk.

These objects, together with other objects and advantages which will be subsequently apparent reside in the details of construction and operation of the suspension system as more fully hereinafter described and claimed. reference being had to the accompanying drawings forming a part hereof, wherein like reference numerals refer to like parts throughout.

BRIEF DESCRIPTION OF THE DRAWINGS

FIG. 5 is a side elevational view of another embodiment of suspension system according to the present invention;

FIG. 6 is a side elevational view of another embodiment of suspension system according to the present invention; and FIG. 7 is an end view, partly in section of the FIG. 6 embodiment, taken along line 7—7 of FIG 6.

DETAILED DESCRIPTION OF THE PREFERRED EMBODIMENTS

Figure 1:
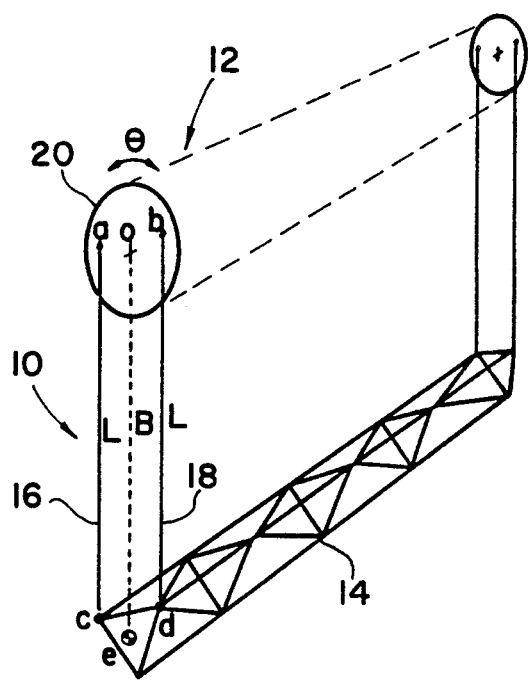
FIG. 1 is a perspective, schematic view of a first, preferred embodiment of the suspension system according to the present invention.
Figure 2:
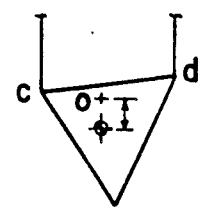
FIG. 2 is an end view of a truss beam supported by the suspension system of FIG. 1.

Referring to FIGS. 1 and 2, a suspension system for testing space structures is referred to generally by the numeral 10. The suspension system includes a plurality of suspension stations 12 attached to a space structure, such as a truss beam 14, along the length thereof for supporting and suspending the truss beam 14 from a rigid support, such as a ceiling (not shown). Although only the end stations 12 are illustrated in FIG. 1, it is understood that a sufficient number of additional stations will be disposed between the end stations at spaced intervals. The exact number of stations will depend on the length and strength of the space structure to be tested.

The system 10 is designed to alleviate the coupling between the suspension system and the structure's torsion modes. To accomplish this, each station 12 includes two cables 16 and 18 of the same length L and a rotatable support disk 20. The cables and disk coact to lower the suspension system's torsion or rotation mode. It is desirable to keep the fundamental natural frequency of the system significantly lower than the lowest structural frequency, which for one 60 meter test mast beam was found to be 0.18 Hz.

The disk 20 is free to rotate about a horizontal axis o. The cables 16 and 18 are arranged to form a parallelogram abcd such that, at rest, the center of gravity of the beam 14 hangs directly below the rotational axis o of the disk 20.

The system has two uncoupled natural pendulum modes. One is the "simple pendulum" mode whose frequency is described by:

$$\omega_s = \sqrt{g/L}$$

Figure 3:
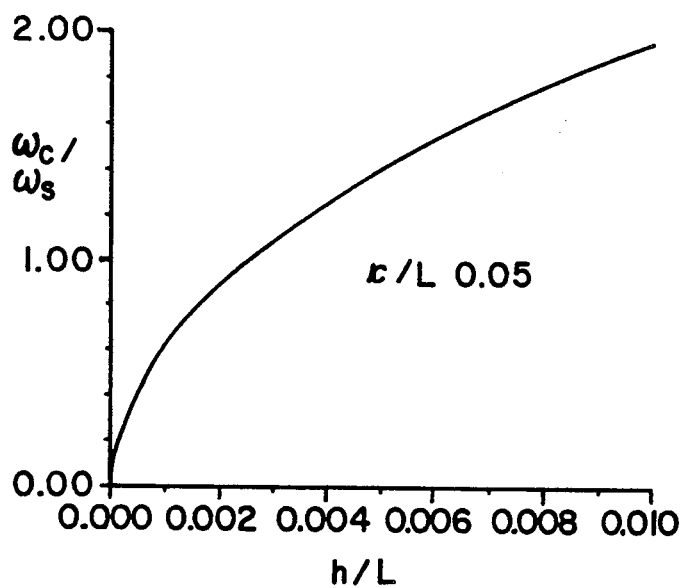
FIG. 3 is a graph illustrating the correlation between "h" and the ratio of $\omega_c/\omega_s$.

The second mode is the torsion or "compound pendulum" mode involving rotation of the body about its own center of gravity. The frequency of the compound pendulum mode can be determined by noting that the cable length L has no affect on this uncoupled mode. Thus, letting L=0 in FIG. 1, the rotational frequency of the suspended body can be found by considering the body as being suspended from a rotational axis located at a distance h, above the center of gravity. This is illustrated in FIG. 2; in FIG. 1, h=L−B. The resulting equation for the frequency of the compound pendulum is:

$$\omega_c = \left[ \frac{(g/L)(h/L)}{(h/L)^2 + (\kappa/L)^2} \right]^{\frac{1}{2}}$$

where $\kappa$ is the radius of gyration of the suspended body about its center of gravity. As h/L is reduced, the ratio of the compound to simple pendulum frequency turns to zero as shown in FIG. 3. Preferably, h is adjusted until it is nearly zero. A slight adjustment of h is acceptable to provide stability for the suspended test structure.

In the embodiment of FIG. 1 a plurality of attachment holes may be provided in the disk in line with the cables 16 and 18 so that the height of attachment points a and b can be adjusted relative to the pivot axis O to thereby vary h.

Figure 4:
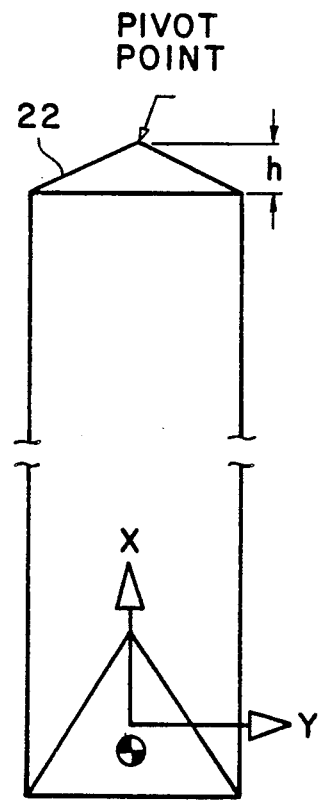
FIG. 4 is an end, schematic view of a suspension system according to the present invention.

In order to analyze the effects of the present invention, the system was modeled analytically as a rigid frame with freedom to rotate about a pivot as shown in FIG. 4. The cables at each beam station are attached to a pivoted frame 22 which corresponds to the disk 20 of FIG. 1. The example used in the study was a 60 meter long truss-beam structure, which is generic space structure designed for operation in a zero-G environment. The beam was cantilevered at one end and supported by twenty-eight cables at fourteen stations along the beam length. The calculated first torsion mode frequency for the unsupported cantilevered beam was 2.01 Hz. With the beam suspended by pendulum cables fixed at the top, the first torsion mode frequency was 72% higher than the unsuspended-beam frequency, whereas with the torsion suspension system of the present invention, the first torsion mode frequency was within 1 % of the unsupported beam frequency.

FIGS. 5-7 illustrate specific embodiments of the torsion suspension system combined with other suspension concepts which provide lateral and vertical translation of the test structure. In FIGS. 5 and 6, the disk is a spoked wheel 24 pivotally mounted on a support 26 which is hung from a ceiling 28 by a bracket 30. The bracket provides a soft vertical suspension as an additional aspect of the suspension system. Active feedback control is provided by means of a servomotor, an active spring extending between the servomotor and the support 26, a main spring extending between the ceiling 28 and the support 26, and a compression member disposed on opposite sides of the support 26. The active feedback control in the vertical degree of freedom provides means for augmenting dynamic characteristics of the vertical mode.

In FIG. 6, the spoked wheel 24 is also pivotally mounted on a support 26. The support 26 is translatable along a horizontal support rod 32 which passes through a linear bearing 34. The device illustrated in FIG. 6 is also provided with an active feedback control which includes a servomotor 36 which drives the support 26 along the horizontal rod 32 in response to a control signal. The torsion suspension system illustrated in FIG. 6 includes suspension cables like those described in FIG. 1. The cables includes two sets of pins 38, 40 and 42, 44, such that the length of the suspension cables can be adjusted by hanging the respective sets of pins in notches provided in the periphery of the spoked wheel 24. The active feedback control system is employed to lower the pendulum frequency by controlling horizontal motion of the pendulum suspension point. A similar arrangement is found in FIG. 5.

FIG. 7 is a cross-sectional view taken along line 7—7 of FIG. 6 and simply shows the cooperation between the linear bearing 34, the support rod 32, and the driving connection between the servomotor 36 and its pulley 37.

The many features and advantages of the present invention are apparent from the detailed specification, and thus, it is intended by the appended claims to cover all such features and advantages of the suspension system which fall within the true spirit and scope of the invention. Further, since numerous modifications and changes will readily occur to those skilled in the art based upon the disclosure herein, it is not desired to limit the invention to the exact construction and operation illustrated and described. Accordingly, all suitable modifications and equivalents may be resorted to falling within the scope and spirit of the invention.

What is claimed is:

1. A low frequency torsional suspension system for testing a space structure having a length and a center of gravity, the system comprising:

a plurality of suspension stations attached to the space structure along the length thereof for suspending the space structure from an overhead support, each suspension station including a disk pivotally mounted to the overhead support and having a horizontal pivot axis, two cables each having upper and lower end and the same length, the lower ends of the two cables being connectable to the space structure and the upper ends being connectable to the disk so that the points of attachment for the upper and lower ends define a parallelogram with the center of gravity of the space structure being vertically beneath the pivot axis of the disk.

2. A low frequency torsional suspension system according to claim 1, wherein the attachment points of the upper ends of the two cables are vertically adjustable.

3. A low frequency torsional suspension system, according to claim 1, wherein each suspension station further comprises an arm having one end slidably connected to the overhead support and the other end rotatably mounting the disk.

4. A low frequency torsional suspension system according to claim 3, wherein each suspension station further comprises a linear bearing providing on the overhead support end of the arm and slidably receiving a horizontal rod mounted in the overhead support, the horizontal rod and linear bearing providing means for moving each disk of each suspension station laterally.

5. A low frequency torsional suspension system according to claim 4, further comprising means coupled to the arm for moving the arm positionally relative to the horizontal rod.

6. A low frequency torsional suspension system according to claim 5, wherein the moving means comprises a servomotor, a pair of pulleys mounted on the overhead support adjacent opposite ends of the horizontal rod, and a belt having two opposite ends coupled to the arm and extending around the two pulleys.

7. A method of suspending a space structure having a length and a center of gravity, comprising:
attaching a plurality of suspension stations to the space structure along the length thereof thereby suspending the space structure from an overhead support, the attaching step comprising pivotally mounting a disk above the space structure, connecting two cables to the space structure and to the disk so that the points of attachment for the upper and lower ends of the two cables define a parallelogram with the center of gravity of the space structure being vertically beneath the pivot axis of the disk.

8. A method of testing vibrational frequencies in a space structure in a simulated weightless environment comprising:
attaching a plurality of suspension stations to the space structure along the length thereof thereby suspending the space structure from an overhead support, the attaching step comprising pivotally mounting a disk above the space structure, connecting two cables to the space structure and to the disk so that the points of attachment for the upper and lower ends of the two cables define a parallelogram with the center of gravity of the space structure being vertically beneath the pivot axis of the disk;
adjusting the distance between the pivot axis of the disk and the points of attachment of the two cables to the disk until the frequency of the suspension system is substantially below the frequency of the space structure; and
subjecting the space structure to vibrational tests.

* * * * *